United States Patent [19]

Pettus

[11] Patent Number: 4,853,177

[45] Date of Patent: Aug. 1, 1989

[54] VOID PLUG FOR ANNULAR FUEL PELLETS

[75] Inventor: William G. Pettus, Monroe, Va.

[73] Assignee: The Babcock & Wilcox Company, New Orleans, La.

[21] Appl. No.: 53,560

[22] Filed: May 21, 1987

Related U.S. Application Data

[63] Continuation of Ser. No. 814,001, Dec. 17, 1985, abandoned, which is a continuation of Ser. No. 492,081, May 6, 1983, abandoned.

[51] Int. Cl.[4] .............................................. G21C 3/16
[52] U.S. Cl. ................................... 376/418; 376/420; 376/455
[58] Field of Search ............... 376/455, 412, 418, 420, 376/414, 428, 416, 453, 431, 423, 419

[56] References Cited

U.S. PATENT DOCUMENTS

| | | | |
|---|---|---|---|
| 3,022,240 | 2/1962 | Bassett | 376/428 |
| 3,067,116 | 12/1962 | Kittel et al. | 376/414 X |
| 3,124,875 | 3/1964 | Takahashi et al. | 376/455 X |
| 3,141,830 | 7/1964 | Klepter et al. | 376/418 |
| 3,170,847 | 2/1965 | Dudak et al. | 376/421 |
| 3,184,392 | 5/1965 | Blake | 376/455 X |
| 3,202,583 | 8/1965 | Salesse et al. | 376/455 X |
| 3,230,151 | 1/1966 | Mills et al. | 376/455 X |
| 3,274,066 | 9/1966 | Zumwalt | 376/418 |
| 3,275,525 | 9/1966 | Bloomster et al. | 376/428 |
| 3,285,825 | 11/1966 | Jens | 376/455 |
| 3,308,033 | 3/1967 | Alfille et al. | 376/455 |
| 3,347,750 | 10/1967 | Thomas | 376/426 |
| 3,378,453 | 4/1968 | Gorker | 376/455 |
| 3,560,339 | 2/1971 | McHugh | 376/455 X |
| 3,619,366 | 11/1971 | Chubb et al. | 376/455 X |
| 3,662,042 | 5/1972 | Kizer et al. | 376/901 |
| 3,898,125 | 8/1975 | Grossman et al. | 376/418 |
| 3,899,392 | 8/1975 | Grossman et al. | 376/418 |
| 3,900,358 | 8/1975 | Bujas et al. | 376/414 X |
| 3,995,000 | 11/1976 | Butler et al. | 376/901 |
| 4,016,226 | 4/1977 | Kosiancic | 376/901 |
| 4,120,752 | 10/1978 | Orken | 376/455 X |
| 4,235,673 | 11/1980 | Mordarski | 376/414 X |
| 4,273,616 | 6/1981 | Andrews | 376/455 |
| 4,432,915 | 2/1984 | Gallivan | 376/421 |
| 4,678,629 | 7/1987 | Popa | 376/455 |

FOREIGN PATENT DOCUMENTS

| | | | |
|---|---|---|---|
| 0132911 | 2/1985 | European Pat. Off. | 376/418 |
| 1445884 | 8/1965 | France | 376/414 |
| 0018508 | 8/1968 | Japan | 376/455 |
| 0147677 | 9/1983 | Japan | 376/412 |
| 1596072 | 8/1981 | United Kingdom | 376/455 |

OTHER PUBLICATIONS

Research Disclosure, "Recent Developements Relating to Nuclear Fuel", 20436, Apr. 1981, No. 204, p. 165.

Primary Examiner—Charles T. Jordan
Assistant Examiner—Daniel Wasil
Attorney, Agent, or Firm—Robert J. Edwards; Mark B. Quatt

[57] ABSTRACT

A porous plug is installed in the central region of a fuel rod of annular fuel pellets and prevents relocation of fuel fragments from the inner surface of each fuel pellet while providing a getter for gases produced in the fuel rod during operation of the nuclear reactor.

5 Claims, 2 Drawing Sheets

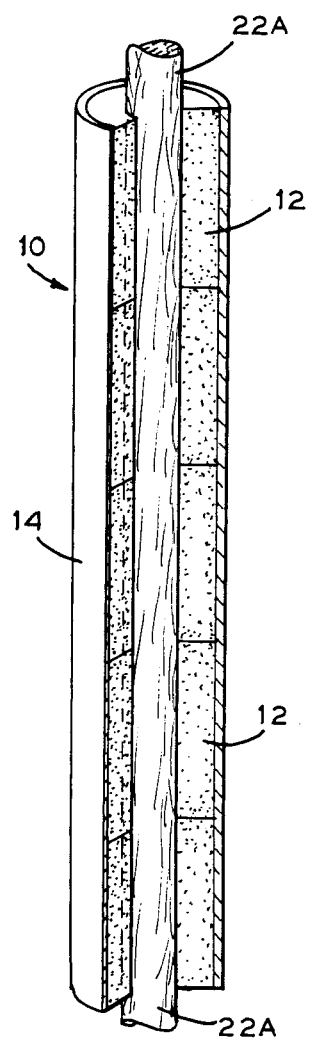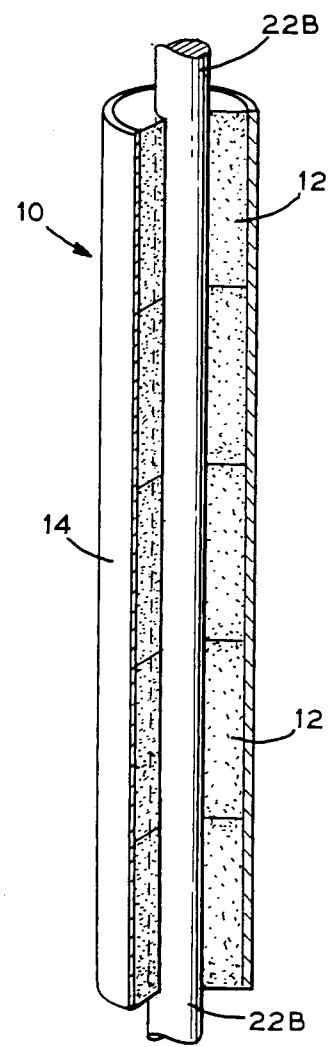

VOID PLUG FOR ANNULAR FUEL PELLETS

This application is a continuation of application Ser. No. 06/814,001, filed Dec. 17, 1985 which is a continuation of application Ser. No. 06/492,081 filed May 6, 1983, both now abandoned.

BACKGROUND OF THE INVENTION

This invention relates to nuclear reactors, and more particularly to fuel rods for pressurized water reactors.

Fuel rods in a pressurized water reactor are typically stacks of uranium dioxide pellets which are contained in an outer cladding of Zircaloy or other material. These fuel rods are formed into bundles comprising a fuel element. Each fuel element also contains a top and bottom end plate as well as several spacer grids along the axial length of the fuel element to hold the fuel rods in place.

For a number of years, the use of annular fuel pellets rather than the conventional solid fuel pellet has been studied. Such an annular fuel pellet is typified by a cross-sectional configuration in which the central part of the pellet is hollow. The use of annular fuel pellets offers a number of advantages over the use of a conventional solid fuel pellet. Firstly, a pellet with a central void or hollow region reduces the maximum fuel temperature. This can provide extended life of the fuel rods and therefore reduction in cost of materials and time to replace spent fuel rods. Secondly, gaseous fission products accumulate within the fuel rod during the life of the fuel. The use of a central void region within the fuel rod acts as a plenum for these gaseous products.

Along with the advantages of the use of an annular fuel pellet, certain problems also arise. One of the main problems in connection with the use of an annular pellet is the possibility that fragments of the nuclear fuel may break off internally and fall into the central void area. These fragments may fall to the bottom of the respective fuel rod and accumulate there. Alternatively, larger fragments may lodge somewhere along the axial length of the central void region. In either event, these fragments or debris may cause power peaking problems, and they would reach a very high temperature and possibly melt due to poor heat transfer. This fragmentation problem is caused by thermal cycling during operation of the nuclear reactor which can result in erosion of the pellets. An ancillary concern is the creation of uncertainty in estimating system conditions after such fragmentation has occurred.

U.S. Pat. No. 4,273,616 discloses an arrangement in which spacer plugs are located at the fuel assembly grid elevations along the fuel rod. These plugs physically trap or catch pellet debris to avoid excessive power peaking and power distribution uncertainties. However, this arrangement inherently allows for redistribution of fissile material axially within the fuel rod and a reaccumulation of debris along the upper surface of each spacer plug. It also fails to prevent further erosion and fragmentation of the annular fuel pellets.

SUMMARY OF THE INVENTION

The present invention solves the problems discussed above that attend the use of annular fuel pellets by installing a porous plug in the central region of the fuel rod in order to prevent the breaking off and relocation of fuel fragments.

The plug is preferably a refractory fiber made from such materials as zirconium oxide, aluminum oxide, or titanium dixide. The porous plug may take the form of a packed fiber, braided rope, or other suitable structure to permit the installation of the plug into the central void region of the nuclear fuel pellets and the packing of the central region to prevent fragments and debris generated on the internal edge of each fuel pellet from falling and relocating within the fuel rod. The porosity of the central plug will provide a plenum area for the gases produced by the fission reactions occurring during operation of the reactor. The plug also acts as a getter for fission product gases, thereby reducing internal pressure, reducing corrosion problems, and reducing release potential. Thus, the use of a porous plug will prevent fuel relocation that could cause reactivity changes, power distribution changes, hot spots and increased gas temperature and pressure. It will additionally act as a physical restraint to fuel chips or flakes on the inner surface of the pellets and thereby maintain heat transfer to the pellets. An additional advantage of the use of a porous plug in this manner is that it allows the use of fuel pellets with thinner annular regions, thus extending the allowable range of void fraction, i.e. volume of the central void region as compared with the total volume of the fuel rod, resulting in optimal fuel design.

BRIEF DESCRIPTION OF THE DRAWINGS

In the accompanying drawings, forming a part of this specification, and in which reference numerals shown in the drawings designate like or corresponding parts throughout the same.

FIG. 3A is a perspective, cut away view of a segment of a pellet stack with a porous ring in the central void region made in accordance with another embodiment of the invention comprising a packed refractory fiber in the central region.

FIG. 3B is a perspective, cut away view of a segment of a pellet stack with a porous plug in the central void region made in accordance with another embodiment of the invention comprising a solid rod in the central region.

DESCRIPTION OF THE PREFERRED EMBODIMENT

Figure 1:
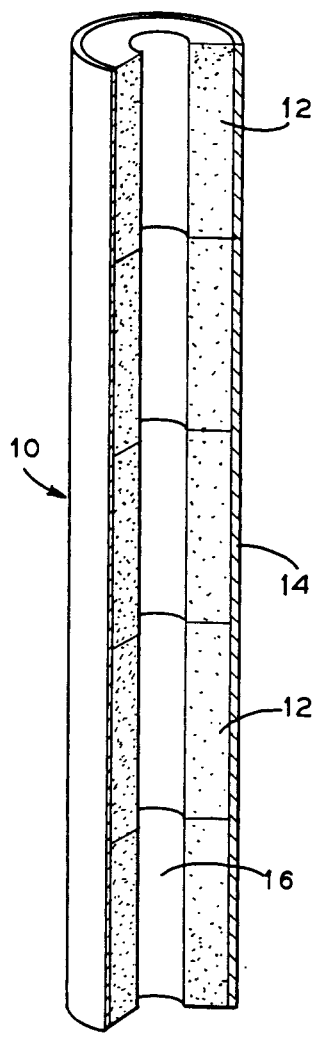
FIG. 1 is a perspective, cut away view of a segment of a conventional annular pellet stack.

FIG. 1 shows a fuel rod segment 10 in which a stack of annular pellets 12 is encased in an outer cladding 14. The fuel pellets are made from any suitable material, typically uranium dioxide. The cladding is typically made from zircaloy. A central region 16 is defined by the axially stacked annular fuel pellets 12 so that a nuclear reactor fuel rod according to the present invention will have a continuous central cavity extending axially along the center of the fuel rod as shown in FIG. 1. Each of the annular fuel pellets 12, as shown, has a cylindrical outer surface in contact with the cladding 14 and a cylindrical inner surface defining a portion of the central cavity. The volume fraction of the central region is about 10% in the conventional art.

Figure 2:
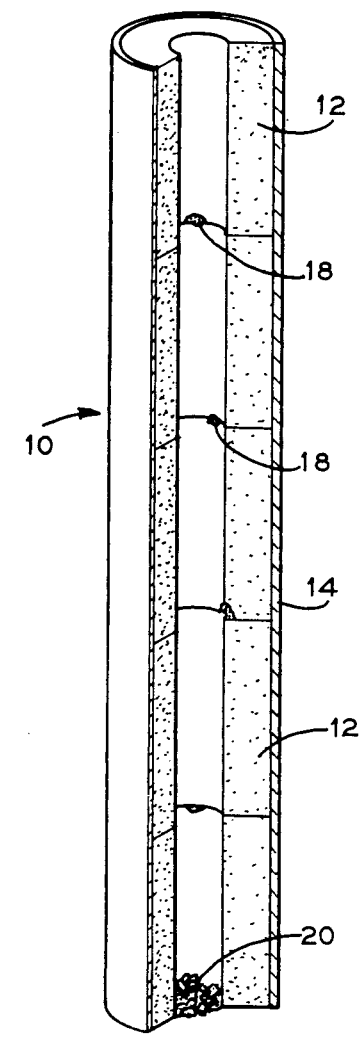
FIG. 2 is a perspective, cut away view of a segment of a pellet stack with typical chipped inner surface.

FIG. 2 shows the fuel rod segment of FIG. 1 after fragmentation and breaking off of fuel material from the inner surface of one or more of the annular fuel pellets 12. Chipped areas 18 represent locations where fuel material has dislocated from its original site within the fuel pellet and either lodged further down the central region 16 of fuel rod segment 10 or else fallen into the bottom of the fuel rod and accumulated as fuel debris 20. Such redistribution of fuel within a fuel rod can cause reactivity changes, and hot areas which reduce the life of the fuel rod and make power distribution estimates more unpredictable.

Figure 3:
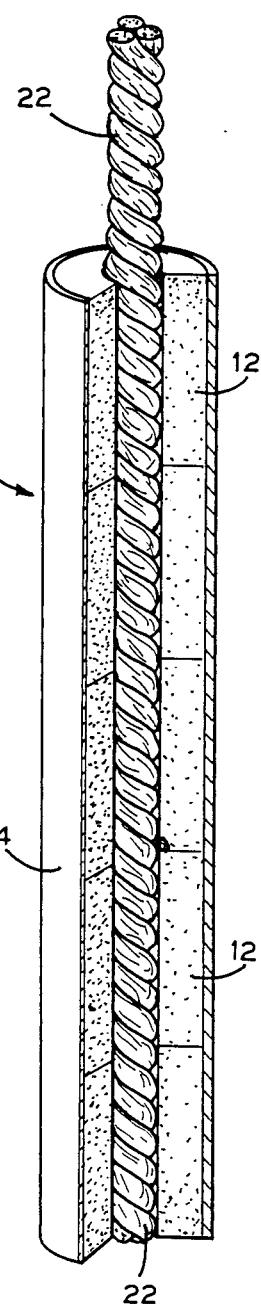
FIG. 3 is a perspective, cut away view of a segment of a pellet stack with a porous plug in the central void region made in accordance with one embodiment of the invention comprising a rope in the central region.

FIG. 3 discloses a fuel rod segment 10 with porous void plug 22 inserted within and substantially filling the central cavity. The porous void plug 22 is installed prior to operation of the nuclear reactor. The porous void plug may be fabricated of a high temperature or ceramic fiber or other suitable material. FIG. 3, for example, illustrates a close fitting rope on which the annular fuel pellets are strung. The plug is designed to have sufficient porosity to accommodate the gas produced by the fuel pellets within the fuel rod over the life time of the fuel, and to exert sufficient pressure against the inner surface of the fuel pellets to prevent fuel fragments and chips from breaking away from the surface and being relocated. In addition to the advantages already described, the use of such a porous plug would mitigate safety and licensing concerns associated with the internal void regions in nuclear fuel, and provide an alternate way of distributing burnable poisons, for example gadolinium oxide in the nuclear fuel.

In addition to the use of a close fitting rope, various alternative physical designs for the porous plug may be utilized. For example, packed fibers 22A as shown at FIG. 3A, twisted strand rope, felt cylinders, loose or compacted fibers, and low density, high porosity solid rods 22B as shown at FIG. 3B may be utilized.

Compositionally, the porous void plug should be a refractory material that is compatible with nuclear fuel and cladding at operating temperatures and is not neutronically detrimental to the system. A number of ceramic materials that satisfy these criteria are available in fiber form and can be spun and woven as a textile. Zirconium oxide fibers, such as those distributed for example by Zircar Products, Inc. are very suitable as a porous void plug for the present invention.

Aluminum oxide fibers such as SAFFIL, a product of Imperial Chemical Industries, Ltd. may also be used in the present invention. Titanium dioxide, yttrium oxide, hafnium oxide, ceric oxide, tantalum oxide, thorium dioxide, uranium dioxide, gadolinium oxide, and graphite are other substances suitable for the plug of the present invention. Mixtures of these and other materials may also be used for the porous void plug.

While in accordance with the provisions of the statutes, there is illustrated and described herein a specific embodiment of the invention, those skilled in the art will understand that changes may be made in the form of the invention covered by the claims and that certain features of the invention may be used to advantage without a corresponding use of the other features.

The embodiments of the invention in which an exclusive property or privilege is claimed are defined as follows:

1. An improved pressurized water reactor nuclear fuel rod comprising, in combination, a gas-tight outer tubular cladding made of zircaloy, a plurality of annular fuel pellets axially stacked within the cladding, each of the fuel pellets consisting essentially of uncoated and unencased uranium dioxide, wherein each of the fuel pellets has a cylindrical outer surface in contact with the cladding and a cylindrical inner surface defining a portion of a continuous central cavity extending axially along the center of the fuel rod, a porous void plug inserted within and substantially filling the central cavity, the porous void plug having a transverse thickness perpendicular to the axis of the cladding substantially equal to the inner diameter of the fuel pellets and pressing upon the inner surface of the fuel pellets so as to exert sufficient pressure against the fuel pellets to prevent the breaking away and the relocation of fuel fragments from the fuel pellets, the porous void plug being a compacted porous refractory fiber material operative as a getter for fission product gases and providing means for distributing burnable poisons within the cladding.

2. The improvement according to claim 1, wherein the porous void plug comprises a packed fiber.

3. The improvement according to claim 2 wherein the packed fiber comprises a refractory fiber, the refractory fiber comprising a material selected from the group consisting of zirconium oxide, aluminum oxide, titanium oxide, yttrium oxide, hafnium oxide, ceric oxide, tantalum oxide, thorium dioxide, uranium dioxide, gadolinium oxide, graphite and mixtures thereof.

4. The improvement according to claim 1 wherein the porous void plug comprises a braided rope.

5. The improvement according to claim 1 wherein the porous void plug comprises a rope of twisted strands.

* * * * *